(No Model.)
J. R. HAWLEY.
PUMP.
No. 547,211. Patented Oct. 1, 1895.
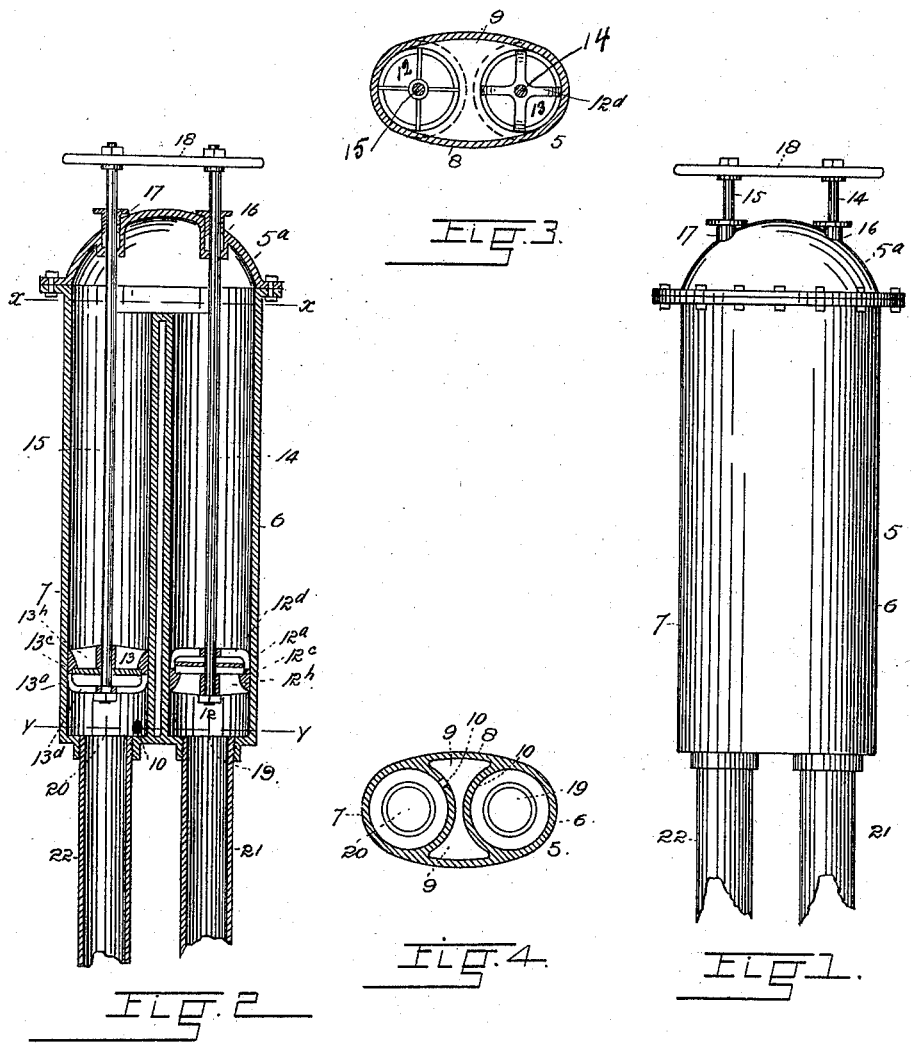
WITNESSES:
G. J. Ollaudet.
Chas. E. Dawson
INVENTOR
J. R. Hawley.
BY
ATTORNEY

UNITED STATES PATENT OFFICE.

JAMES R. HAWLEY, OF DENVER, COLORADO.

PUMP.

SPECIFICATION forming part of Letters Patent No. 547,211, dated October 1, 1895.

Application filed March 4, 1895. Serial No. 540,443. (No model.)

*To all whom it may concern:*

Be it known that I, JAMES R. HAWLEY, a citizen of the United States of America, residing at Denver, in the county of Arapahoe and State of Colorado, have invented certain new and useful Improvements in Pumps; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in pumps; and it consists of the features hereinafter described and claimed, all of which will be fully understood by reference to the accompanying drawings, in which is illustrated an embodiment thereof.

In the drawings, Figure 1 is a side elevation of my improved pump. Fig. 2 is a vertical longitudinal section taken through the center of the bent cylinder. Fig. 3 is a horizontal section taken on the line $x\ x$, Fig. 2. Fig. 4 is a similar section taken on the line $y\ y$, Fig. 2.

Similar reference characters indicate corresponding parts in the views.

Let the numeral 5 designate the bent cylinder, having the parallel legs 6 and 7, connected by a casing 8, inclosing an air-chamber 9. The discharge-leg 7 of the cylinder is provided with an orifice 10, leading to the air-chamber. The chamber of the cylinder is continuous, and the water which enters the receiving-leg 6 passes freely to the discharge-leg 7, there being an uninterrupted passage-way from the receiving to the discharge extremity.

The cylinder-legs are provided with pistons 12 and 13, having stems 14 and 15, respectively, passing through stuffing-boxes 16 and 17, located in the connecting arch or bend $5^a$. The protruding extremities of the piston-stems are connected by a cross-head 18. The pistons 12 and 13 are provided with oppositely-disposed valves $12^a$ and $13^a$, respectively. The valve $12^a$ is located above its seat $12^c$, and therefore moves upward when it opens or leaves its seat. The valve $13^a$ is located below its seat $13^c$, and consequently moves downward when it opens or leaves its seat. The pistons 12 and 13 are provided with spider-shaped guards $12^d$ and $13^d$, respectively, located the one above the other below its corresponding valve, whereby when the valves are open they are held in suitable proximity to their respective seats. The heads $12^h$ and $13^h$ of the pistons fit nicely within the respective legs of the cylinder. The lower extremities of the cylinder-legs are provided with openings 19 and 20, respectively, the one being the inlet and the other the outlet for the pump-cylinder. A suction-pipe 21 is connected with the receiving end of the cylinder, and a discharge-pipe 22 is connected with the outlet extremity thereof. It will be observed that the openings 19 and 20 have no check-valves. The pistons are simultaneously operated by the reciprocation of the cross-head. As the latter moves upward or outward, the valve of the piston 12 closes and remains closed until the return movement of the cross-head commences, when the said valve opens and remains open until the upward movement again begins. The action of the valve belonging to the piston 13 is exactly the reverse—namely, when the cross-head is making the upward movement the valve is open, while during the downward movement the said valve is closed. During the upward movement of the cross-head the water rises in the leg 6 of the cylinder, while during the downward movement of the cross-head the water passes through the piston 12 and flows into the leg 7 of the cylinder, since a partial vacuum is established in the last-named leg during the downward movement of its respective piston. The water flows from the leg 6 into the leg 7 to fill this vacuum. Again, as the cross-head moves upward the water flows through the piston 13, filling the leg 7 below the piston, and as the cross-head moves downward the piston forces the water out of the leg 7 through the opening 20. Hence during the operation of the pump, which is effected by the reciprocation of the cross-head, there is a continuous flow of water through the cylinder.

It will thus be seen that my construction embodies a double-action force-pump devoid of check-valves.

Having thus described my invention, what I claim is—

A pump comprising a double cylinder having two parallel legs and a continuous chamber, pistons located in the respective cylinder legs and having oppositely disposed valves, 5 piston-stems protruding from the cylinder and suitably connected, and an air chamber communicating with the discharge leg of the cylinder and inclosed by a casing connecting the two cylinder legs, said casing being closed at the top and bottom, substantially as described.

In testimony whereof I affix my signature in the presence of two witnesses.

JAMES R. HAWLEY.

Witnesses:
CHAS. E. DAWSON,
A. J. O'BRIEN.